United States Patent [19]
Young

[11] Patent Number: 5,988,609
[45] Date of Patent: Nov. 23, 1999

[54] ELASTOMERIC TUBULAR STOP MEMBER

[76] Inventor: James A. Young, 4170 Parker, Dearborn Heights, Mich. 48125-2232

[21] Appl. No.: 08/957,865

[22] Filed: Oct. 27, 1997

[51] Int. Cl.$^6$ .................................. F16M 7/00; F16F 1/36
[52] U.S. Cl. ............................................ 267/140; 267/153
[58] Field of Search ..................................... 267/153, 257, 267/258, 292, 139, 140 OR; 403/225; 293/102; 177/184

[56] References Cited

U.S. PATENT DOCUMENTS

| | | | |
|---|---|---|---|
| 3,418,815 | 12/1968 | Kumazawa | 267/140 |
| 3,542,353 | 11/1970 | Hickman | 267/153 |
| 3,779,536 | 12/1973 | Lackmann | 267/140 |
| 4,548,150 | 10/1985 | Drewett | 267/140 |
| 5,137,313 | 8/1992 | Teig | 267/140 |
| 5,232,061 | 8/1993 | Neeleman | 267/140 |
| 5,280,890 | 1/1994 | Wydra | 267/153 |

*Primary Examiner*—Robert J. Oberleitner
*Assistant Examiner*—Thomas J. Williams

*Attorney, Agent, or Firm*—Harness,Dickey & Pierce P.L.C.

[57] ABSTRACT

A suspension stop member, for positioning between a first, movable element and a second, relatively fixed element, such as between the frame and the axle of a vehicle, for resiliently absorbing suddenly applied shocks and stopping the relative movements of the elements, is formed of a generally pear-shaped, resilient tube having a generally circular opening. The tube has an upper, flat end portion, for fastening to the movable element, and a lower, flat end portion for engaging the second element. The sides of the outer surface of the tube are bulged outwardly from the upper end portion part way towards the lower end portion and then are tapered downwardly towards each other to join the lower end portion. The upper part of the surface defining the opening is generally flat and coextensive with said upper end portion. The thickness of the wall segment at the lower end of the stop member is considerably greater than the generally similar wall thicknesses of the remainder of the member. The member collapses downwardly, under a suddenly applied load that moves the elements together, to cause its side portions to bulge outwardly further and to absorb the load and to stop the relative movement of the elements when the opening is fully collapsed.

12 Claims, 3 Drawing Sheets

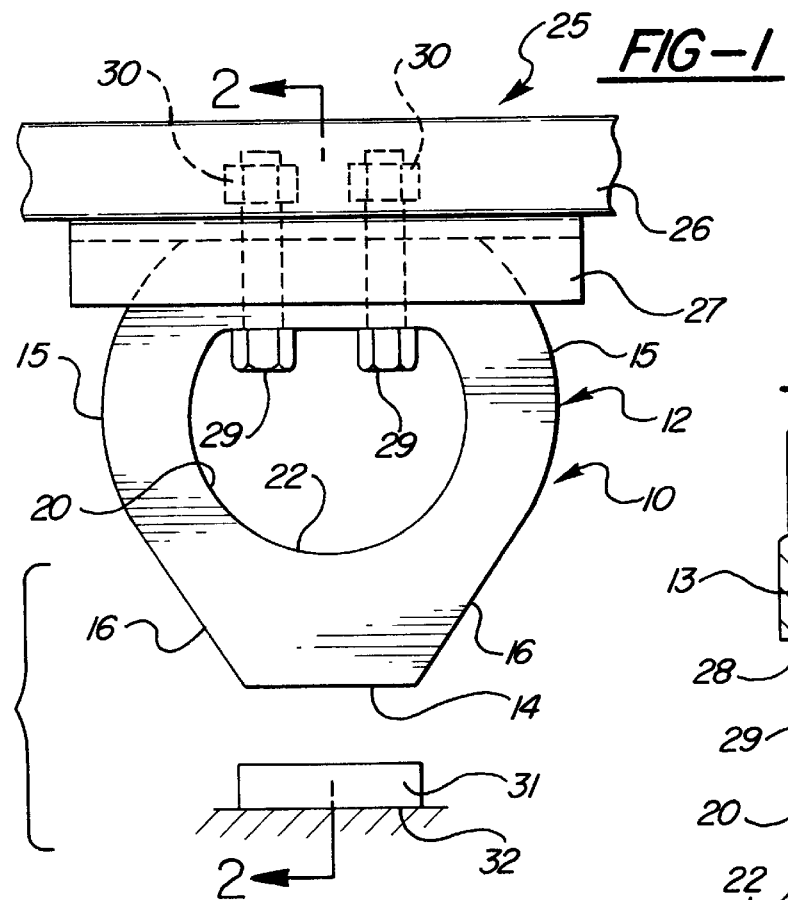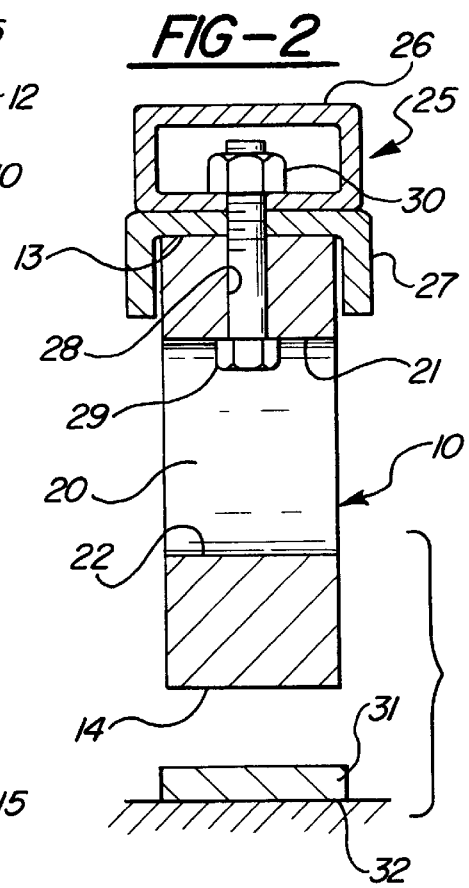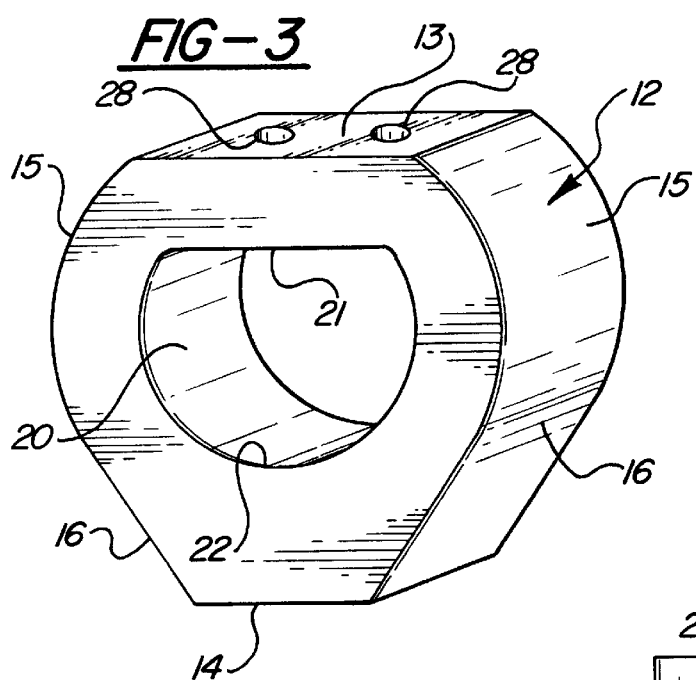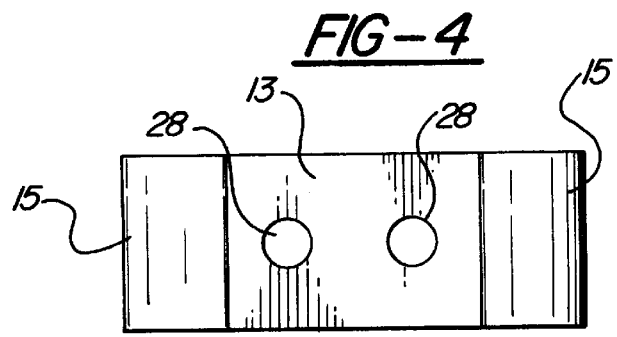

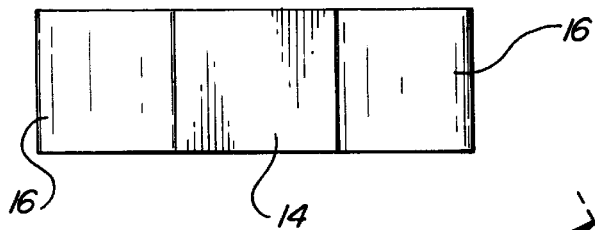
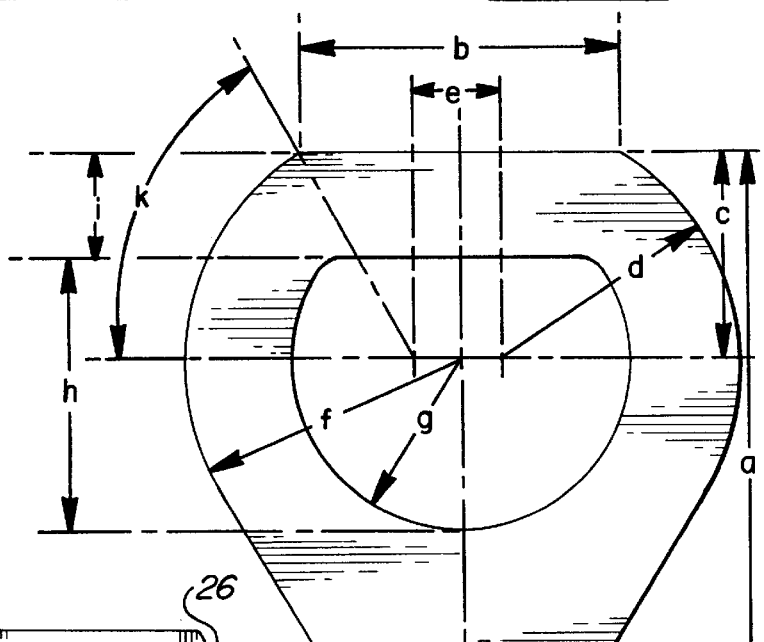
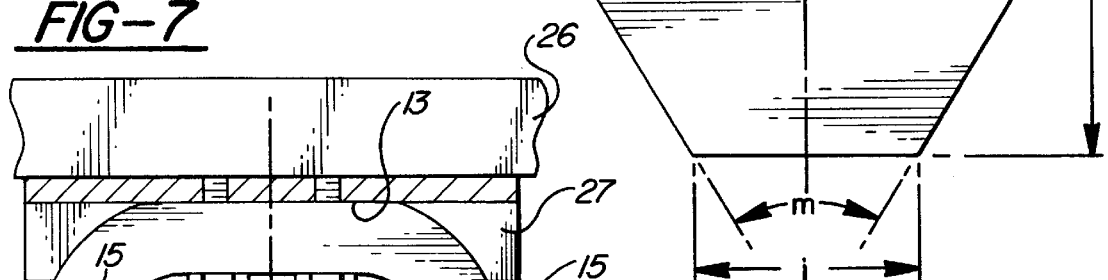
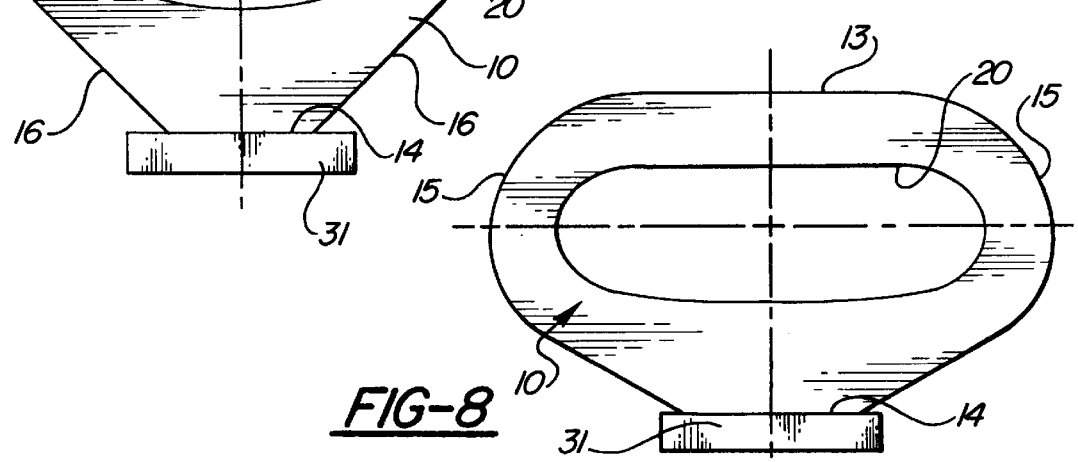

ELASTOMERIC TUBULAR STOP MEMBER

BACKGROUND OF INVENTION

This invention relates to a resilient stop or snubber for resiliently stopping movement between a movable element and a relatively fixed element, such as between a truck frame and axle or the like.

Various types of springs and spring-like devices have been interposed between the frame of a truck at its cargo supporting area and the axles located beneath that area for resiliently absorbing forces and stopping relative movements caused by sudden load applications or shocks. One such type device comprises rubber-like blocks or members which are positioned between the vehicle frame and a pad formed on the axle to resiliently absorb suddenly applied loads, such as road shocks, and to stop the relative movement between such vehicle parts.

Examples of such type stop devices are illustrated and described in U.S. Pat. No. 3,109,639 issued Nov. 5, 1963, to Nicolaisen and U.S. Pat. No. 3,236,513 issued Feb. 22, 1966, to Nicolaisen. These patents disclose a generally triangularly shaped rubber-like stop which is fastened between two relatively movable elements for absorbing loads and, upon collapsing, stopping movement of the elements towards each other.

The present invention relates to an improved resilient or rubber-like stop member which can be easily mounted upon a vehicle, such as upon a truck frame, between the frame and an axle, either as original equipment or as an after-market device. The shape of this improved stop member produces a relatively inexpensive and efficient and effective force absorber and motion limiting stop, which is particularly useful with vehicle suspensions as well as for other installations requiring spring-like devices for connecting relatively movable elements.

SUMMARY OF INVENTION

This invention contemplates a resilient or rubber-like stop member which may be fastened to a movable element for engaging a relatively fixed element for collapsing therebetween when the elements move towards each other under the influence of suddenly applied loads or shock. Thus, the stop member resiliently absorbs the forces and ultimately stops the relative movement between the elements in a manner similar to a spring. The stop member is in the form of a short tube whose exterior surface is roughly shaped like a pear having a flat, wide upper end portion and a narrow, flat, lower end portion with outwardly bulged side portions. The lower ends of the bulged side portions taper downwardly and inwardly towards the narrow, lower, end portion. The cross-sectional shape of the interior opening which extends through the stop member is generally arcuate or approximately circularly curved, but with an upper flattened part which is aligned with and generally overlapped by the flat upper end portion of the tube. The lower segment of the stop member is approximately trapezoidal in cross-sectional shape and is considerably thicker than the thickness of the walls formed by the bulged side portions and the flat upper end portion.

The flattened upper end portion of the stop member may be fastened, such as by bolts or other mechanical fasteners, to the underside of the frame of a vehicle above the axle of the vehicle. For example, the stop member may be located at the cargo area of the frame of a pickup truck. The lower, narrow end of the stop may be positioned above, out of contact with, a plate secured upon the truck axle housing for engaging the plate. The stop member is compressed between the axle plate and the frame when these two parts move together, e.g. when the frame moves down or the axle housing moves upwards in response to road shocks.

The stop member may be easily assembled upon a vehicle frame, either as original equipment or as after-market equipment and may serve a function somewhat similarly to a helper spring or vehicle suspension spring, that is, as a part of the suspension system of the vehicle. Because of the shape of the stop member and manner in which the stop member collapses under suddenly applied loads, it substantially improves the suspension characteristics of a vehicle, such as a small truck, without excessive cost penalties.

It is an object of this invention to provide a simplified, inexpensive suspension stop member which will absorb sudden shocks and stop excessive relative movements between the frame and axle systems of the vehicle.

Another object of this invention is to provide a simplified, inexpensive resilient stop member which, under applied load, will gradually collapse in a manner in which its respective portions will absorb the load until a final collapse point is reached which then stops further relative movement between the vehicle parts.

Yet another object of this invention is to provide a simplified stop member which may be used in places where a pair of elements are relatively movable toward each other and a springy device is needed for temporarily absorbing the load forces imposed and for stopping excessive relative movement of the elements.

Still another object of this invention is to provide a resilient load absorbing stop member which can be easily and inexpensively applied upon a vehicle and other locations where excessive relative movement between a spaced pair of elements must be stopped.

These and other objects and advantages of this invention will become apparent upon reading the following description, of which the attached drawings form a part.

DESCRIPTION OF DRAWINGS

FIG. 1 illustrates the stop member secured to the vehicle frame and positioned above a support pad mounted on the vehicle axle, with the frame, pad and axle shown schematically.

FIG. 2 is a cross-sectional view taken in the direction of arrows 2—2 of FIG. 1.

FIG. 3 is a perspective view of the stop member.

FIG. 4 is a top, plan view of the stop member.

FIG. 5 is a bottom, plan view of the stop member.

FIG. 6 is a slightly enlarged, elevational view of the stop member with an example of the various dimensions labeled for indicating relative sizes of the portions of the stop member.

FIG. 7 is a view, partially in cross-section, similar to FIG. 1 schematically showing the stop member mounted upon a vehicle frame, but contacting the axle pad as the frame and axle begin moving towards each other under an applied load.

FIG. 8 is a schematic view showing a step in the collapsing of the stop member in response to continued application of load.

DETAILED DESCRIPTION

Figure 9:
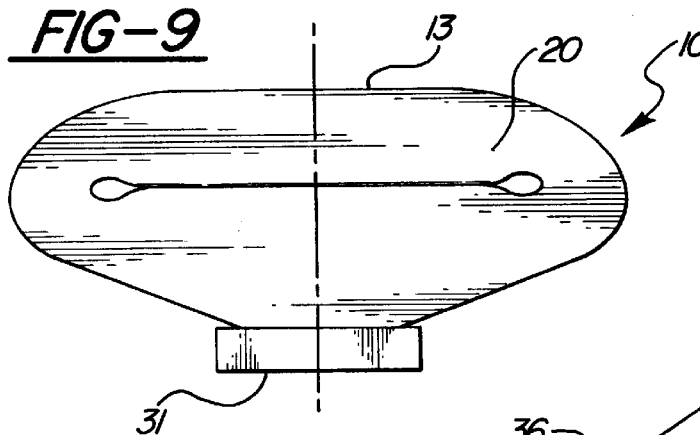
FIG. 9 schematically illustrates the stop member collapsed under load for stopping relative movement between the opposing frame and axle.

FIGS. 1–3 illustrate a resilient, rubber-like or elastomeric, tubular member 10 whose cross-section is roughly shaped in the form of a pear. That is, the outer surface 12 of the stop member is formed with an upper, wide, generally planar end portion 13 and the diametrically opposite, lower end portion 14 is generally planar and narrower than the upper end portion. The sides of the stop member are outwardly curved or bulged to form upper side portions 15. These upper side portions are extended into tapered lower side portions 16 which converge from the bulged side portions 15 to the narrow lower end portion 14.

A central, generally circular or arcuately shaped opening 20 is formed through the stop member. The upper end portion 21 of the surface defining the opening is formed substantially flat and is approximately coextensive with, that is, it overlaps, the upper end portion 13 of the outer surface. The lower part of the arcuate opening 20 forms a curved portion 22 which overlaps and is aligned with the lower end portion 14 of the stop member.

The stop member is positioned between a pair of elements which move relatively towards each other. For explanatory purposes, one element is designated as the movable element 25 which may, for example, comprise a portion of the tubular frame 26 of a vehicle such as a pick-up truck. An inverted channel 27 is positioned below the tubular frame 26 and may be welded or bolted thereto or, alternatively, depending upon the vehicle construction, simply positioned loosely in place. Holes 28 are pierced through the upper end of the stop member. Bolts 29 are inserted through the pierced holes and through corresponding holes in the base of the channel 27 and the base of the tubular frame 26. The bolts may be secured in place with suitable nuts 30. Other conventional fastening devices may be used, such as rivets, or screws, for the purposes of mechanically fastening the stop member in its desired location.

A movable element in the form of a plate 31, fastened to a vehicle axle housing 32, for example, is located below the narrow, lower end of the stop member. The axle housing structure is schematically shown as the plate may be formed as either an integral part of that structure or may be a separate plate that is welded or secured to the structure by bolts or the like.

Using a vehicle as an illustration of the operation, the cargo area of a truck, positioned upon a suitable vehicle frame, would normally be supported upon a conventional suspension system having appropriate springs and the like, for mounting over the wheel axle housings. For illustration purposes, the truck frame is designated as a movable element and the plate on the axle is designated as the relatively fixed element. Since a vehicle axle normally may move up and down in response to road bumps and shocks and, similarly, the truck bed and frame may likewise move up and down in response to varying bumps and loads encountered, either can be designated as the fixed or movable element. Thus, the use of those terms are to be considered as alternatives for the two elements between which the stop member is positioned. Moreover, if the device is used in other types of constructions where a stop or bumper of the type disclosed herein is used, the terms "movable" and "fixed" may likewise be applied where there is relative movement or movement of either or both of the two elements between which the stop is located.

In operation, FIGS. 7–9, illustrate the two elements relatively moving together, that is, the truck bed moves down under a suddenly applied force or the axle plate moves upwardly under a suddenly applied force or both elements move. This movement squeezes the stop member between the elements as shown in FIG. 7. That causes the bulged side walls 15 to bulge laterally outwardly even more. The bulging action also causes a rolling-like movement of the upper portions of the side walls.

Continued application of the load causes further outward bulging and collapsing of the tubular stop member, as shown in FIG. 8. As the load increases, the stop member finally collapses until its opening is compressed closed, as shown in FIG. 9. At that point the stop member acts like a solid rubber-like bumper. Meanwhile, during the collapsing stage, the force applied is absorbed and dissipated through the rolling action, and the flexing or bending or bulging of the stop member.

Preferably, the stop is formed with its bulged side walls being of substantially equal thickness but of a lesser thickness than the upper segment of the wall which is located between the upper end portion 13 and the upper surface portion 21 of the opening. The arcuate shape of the lower portion 22 of the opening 20, together with the tapered lower side portions 16, produce a cross-sectional shape which is approximately similar to a trapezoid. The height of the trapezoid, that is, its vertical thickness as seen in the drawings, is considerably greater than the wall thicknesses of the bulged portions as well as the upper segment.

Although the dimensions of the various parts of the stop member are not critical, nevertheless, to give a general size relationship between the various segments that make up the stop member, FIG. 6 designates the various dimensions by letters. Hence, as an example only, a series of dimensions are given below for one satisfactory construction:

a.—4.34" in height b.—2.62" width of upper end portion 13 c.—1.62" from top to central axis d.—1.88" radius of upper portion 15 of bulge e.—0.74"; location of center point of radii d relative to vertical center line f.—2.25" radius of lower portion of bulge g.—1.38" radius of inner surface of arcuate opening h.—2.25" vertical height of opening 20 i.—0.78" thickness of wall segment at upper end j.—1.12" width of lower end surface 14 k.—55° arc of upper portion 15 of bulge m.—76° arc of tapered side portions 16

As an example, the length of the tubular member, i.e. in the direction of the central axis of the tube, may be on the order of 2". It should be understood that the foregoing dimensions may be varied depending upon the anticipated loads for a particular application, but the general relationship of the parts are preferably to be followed for best results in operation. The material out of which the stop member is made may vary, but should be a suitably resilient, strong and durable rubber-like material.

Figure 10:
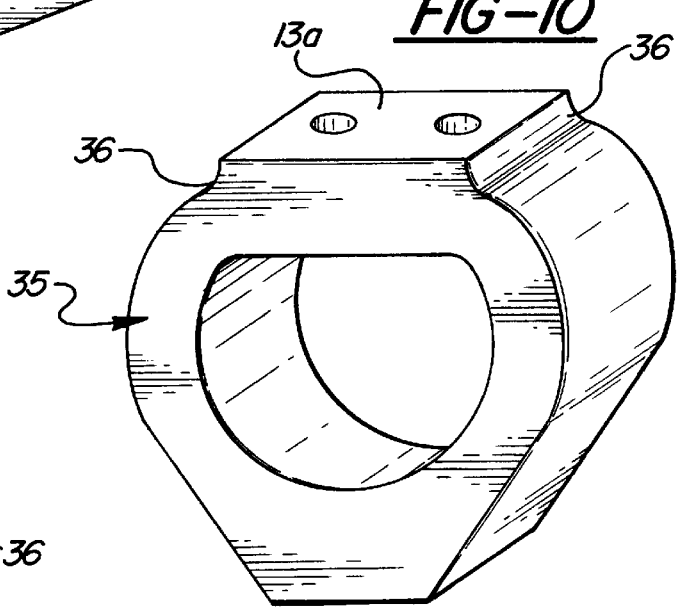
FIG. 10 is a perspective view of a modified stop member.
Figure 11:
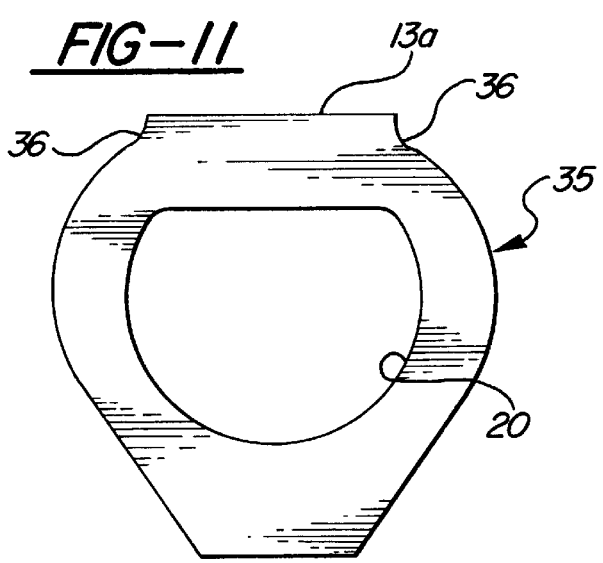
FIG. 11 is a front elevational view of the modified stop member of FIG. 10.
Figure 12:
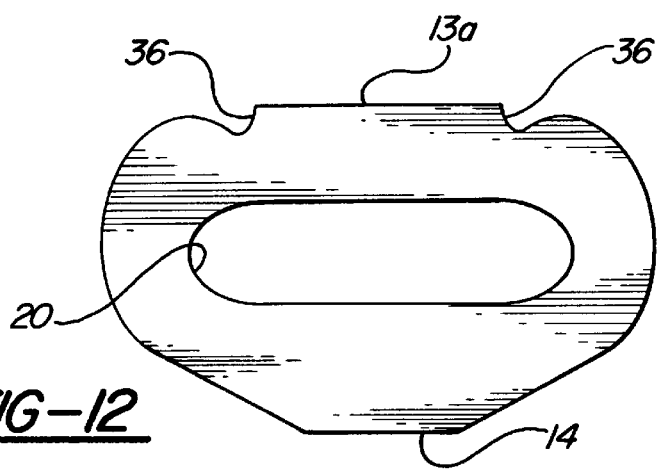
FIG. 12 illustrates the stop member of FIG. 10 partially collapsed under a load.

FIGS. 10–12, inclusive, illustrate a modified stop member 35 which is illustrated as being substantially identical to the previously mentioned stop member 10 with one exception. That is, the upper portion 13a is raised slightly and is connected through a pair of fillets 36, which may be curved or straight, to the upper ends of the curved sides of the stop member. The small fillets, which may be, for example, on the order of about 0.12" form a pair of channel-like depressions on opposite sides of the upper end portion 13a when the stop member collapses, as illustrated in FIG. 12. This formation tends to cause a rolling action of the wall material near these channel-like depressions which further absorbs energy.

The absorbed energy of sudden loads is released upon separating movements of the movable and fixed elements. In contrast, the lower segment of the stop member, which is generally trapezoidal in shape, is illustrated in FIGS. 7–10 and 12, acts like a rubber-like block for absorbing energy that is much less compressible and movable than the upper portions of the stop member.

This invention may be further developed within the scope of the following claims. Thus, having fully disclosed an operative embodiment of my invention, I now claim:

1. A resilient load-absorbing stop for positioning between a movable, load-bearing element and a spaced-apart, second element, comprising:

a resilient, elastomeric tubular member arranged in the space between said elements with the axis of the member being generally parallel to the elements;

the outer surface of said member being generally pear-shaped in cross-section to provide opposite wide and narrow end portions integrally joined with outwardly bulged side portions, such that the outwardly bulged side portions extending laterally beyond said wide end portion, and the inner surface defining the tubular opening of said member having a planar segment and generally circularly curved segment in cross-section to form the inner surface of the tubular member;

said wide end portion being generally planar and being adapted to be secured to said movable element, and said narrow end portion being generally planar and adapted to engage said second element;

the inner surface generally planar segment being aligned with and overlapping the wide end portion of the member to form a wide end wall portion therebetween; said narrow end portion of the member being aligned with and overlapped by an arc of the inner curved surface of the member to form a wall portion therebetween which is substantially thicker than said wide end wall portion;

whereby movement of the movable element in response to a suddenly applied load, towards the fixed element squeezes the member between the elements and successively causes the narrow end portion of the member to tightly engage the second element and thereafter causes the member to gradually collapse towards the direction of the fixed element while gradually bulging further the bulged side portions sideways in opposite directions generally parallel to the axis of the member to absorb the load and stop the movement of the movable element relative to the second element.

2. A stop as defined in claim 1 and with the outer surface of the wall having side parts that diverge outwardly from the narrow end portion to integrally join with the respective bulged side portions to form a narrow end wall segment which is approximately trapezoidal in cross-sectional shape.

3. A stop as defined in claim 2 and including the thickness of said wall segment being greater than the thickness of the bulged side portions of the wall.

4. A stop as defined in claim 2 and with the wide end portion being joined to the bulged portion by generally curved fillets, whereby the bulged portions tend to roll adjacent the wide end portion as they bulge outwardly during the collapse of the member under a suddenly-applied load.

5. A stop as defined in claim 2 and including means for physically attaching the wide end portion to the movable element.

6. A stop as defined in claim 2 and said movable element being secured to a vehicle frame and said second element being formed on a vehicle axle housing located beneath the frame, wherein the stop forms a part of the vehicle suspension.

7. A stop as defined in claim 6 and said second element being normally spaced a distance beneath and engaging the narrow end portion of the member when the vehicle frame and axle housing move together under a suddenly applied load.

8. A resilient suspension stop for mounting upon a vehicle frame, including a frame supporting a truck cargo section, which forms a movable element and for engaging a part of an axle mechanism located beneath the vehicle frame, which forms a second element, for absorbing suddenly applied loads which move the elements together, comprising:

a tubular stop member formed of a resilient material, having an outer surface formed in a generally pear-shape, with an upper, generally flat end portion formed for securement to the movable element and a lower, generally flat portion formed for engaging the second element so that the stop member is squeezed between the elements when they move together;

the sides of the stop member being outwardly bulged from the upper end portion part way towards the lower end portion to form side bulged portions such that the outwardly bulged side portions extending laterally beyond said upper end portion and being tapered downwardly towards each other from the side bulged portions to the narrow lower end portion;

a generally circularly curved in cross-section opening formed within the stop and being generally coaxial with the arc of curvature of the bulged portion, with the surface defining the opening having a generally flat portion that is aligned with and overlaps the upper end portion to form a wall segment therebetween;

said wall segment and the portions of the wall formed between the surface of the opening and the outer surface of the bulged portion being of generally similar thickness;

the segment of the wall formed between the lower end portion and the arc of the curved surface defining the opening being thicker than the remaining walls wall thicknesses;

whereby relative movements of the movable elements and the second element towards each other in response to a suddenly applied load, successively causes the narrow end portion of the member to tightly engage the second element and thereafter to cause the member to gradually collapse with the side portions further bulging sideways outwardly in opposite directions until the opening therein is collapsed to stop further movement of the elements relative to each other.

9. A stop as defined in claim 8 and with the outer wall surfaces defining the bulged end portion to integrally join with the respective bulged side portions to form a narrow end wall segment which is approximately trapezoidal, with an arcuate large base, cross-sectional shape.

10. A stop as defined in claim 9 and with the width of the upper end portion, transverse to the axis of the stop, being greater than the width of the lower end portion in the same direction.

11. A stop as defined in claim 10 and including means formed on the upper end portion for securing the stop member to the movable element.

12. A stop as defined in claim 11, and said means including holes formed through the wall portion defined by the upper end of the member for receiving bolts for mechanically securing the stop to the movable element.

* * * * *